(12) United States Patent
Walker et al.

(10) Patent No.: US 10,518,195 B2
(45) Date of Patent: *Dec. 31, 2019

(54) INLET DIVERTER

(71) Applicant: Worthington Industries, Inc., Worthington, OH (US)

(72) Inventors: Patrick R. Walker, Pataskala, OH (US); Shaun J. Pressly, Garden City, NJ (US); Charles Mark Bevington, Big Prairie, OH (US); Patrick J. Siewny, Pickerington, OH (US); Naethan Eagles, Dublin, OH (US); David J. Hesse, Columbus, OH (US)

(73) Assignee: WORTHINGTON INDUSTRIES, INC., Columbus, OH (US)

( * ) Notice: Subject to any disclaimer, the term of this patent is extended or adjusted under 35 U.S.C. 154(b) by 173 days.

This patent is subject to a terminal disclaimer.

(21) Appl. No.: 15/638,562

(22) Filed: Jun. 30, 2017

(65) Prior Publication Data

US 2018/0154284 A1    Jun. 7, 2018

Related U.S. Application Data

(63) Continuation of application No. 15/439,060, filed on Feb. 22, 2017, now Pat. No. 9,724,624, which is a (Continued)

(51) Int. Cl.
*B01D 45/00* (2006.01)
*B01D 19/00* (2006.01)
(Continued)

(52) U.S. Cl.
CPC ......... *B01D 19/0042* (2013.01); *B01D 3/008* (2013.01); *B01D 17/0211* (2013.01); *B01D 21/0042* (2013.01); *B01D 21/0045* (2013.01); *B01D 45/08* (2013.01); *B01D 45/12* (2013.01); *B01D 45/16* (2013.01); *B01D 50/002* (2013.01); *A47L 9/1608* (2013.01)

(58) Field of Classification Search
CPC ...... B01D 50/002; B01D 45/16; B01D 45/08; B01D 45/12; B01D 19/0042; B01D 21/0045; B01D 17/0211; B01D 21/0042; A47L 9/1608
See application file for complete search history.

(56) References Cited

U.S. PATENT DOCUMENTS 2,221,385 A * 11/1940 Rogers ................... B01D 45/02
                                                         209/143
2,358,508 A *  9/1944 Hersh .................... B01D 45/08
                                                          55/399

(Continued)

*Primary Examiner* — Dung H Bui
(74) *Attorney, Agent, or Firm* — Tucker Ellis LLP; Carlos Garritano (57) ABSTRACT

Methods of separating a multiphase mixture are provided. The multiphase flow can include petrochemicals. The multiphase flow is flowed through a vane assembly having a plurality of curved passages. The multiphase mixture is gradually decelerated such that it collides with surfaces of the vane assembly at relatively oblique angles and at lower relative speeds. Such a configuration can reduce droplet breakup which, in turn, can preserve larger droplet sizes that are more likely to settle to a liquid bed below the inlet diverter due to gravity.

20 Claims, 9 Drawing Sheets

Related U.S. Application Data continuation of application No. 15/366,501, filed on Dec. 1, 2016, now Pat. No. 9,643,105.

(51) Int. Cl.

| | | |
|---|---|---|
| *B01D 50/00* | (2006.01) | |
| *B01D 45/16* | (2006.01) | |
| *B01D 45/08* | (2006.01) | |
| *B01D 45/12* | (2006.01) | |
| *B01D 3/00* | (2006.01) | |
| *B01D 17/02* | (2006.01) | |
| *B01D 21/00* | (2006.01) | |
| *A47L 9/16* | (2006.01) | |

(56) References Cited

U.S. PATENT DOCUMENTS

| | | | | |
|---|---|---|---|---|
| 2,422,527 | A * | 6/1947 | Campbell | B01D 45/08 55/444 |
| 3,876,396 | A * | 4/1975 | Arnold | B01D 45/08 261/118 |
| 4,189,990 | A * | 2/1980 | Kittler | F24C 15/20 454/251 |
| 4,738,585 | A * | 4/1988 | von Bockh | F22B 37/28 415/115 |
| 4,767,424 | A * | 8/1988 | McEwan | B01D 45/16 55/329 |
| 5,342,422 | A * | 8/1994 | Wimbock | B01D 45/08 55/444 |
| 6,386,520 | B2 * | 5/2002 | McEwan | B01D 3/008 261/114.1 |
| 6,454,825 | B1 * | 9/2002 | Cheimets | B01D 45/08 55/446 |
| 7,166,140 | B2 * | 1/2007 | Entezarian | B01D 45/08 55/320 |
| 7,459,001 | B2 * | 12/2008 | Christiansen | B01D 45/16 55/343 |
| 7,931,719 | B2 * | 4/2011 | Sams | B01D 45/12 55/348 |
| 7,947,123 | B2 * | 5/2011 | Kwok | F24C 15/2035 126/299 C |
| 8,216,331 | B2 * | 7/2012 | Muller | B01D 46/08 55/434 |
| 8,470,080 | B1 * | 6/2013 | Ball, IV | B01D 17/0211 95/24 |
| 8,627,848 | B2 * | 1/2014 | Bambara | B01D 19/0042 137/1 |
| 2003/0000186 | A1 * | 1/2003 | West | B01D 45/14 55/459.1 |
| 2003/0150324 | A1 * | 8/2003 | West | B01D 17/0211 95/268 |
| 2007/0044437 | A1 * | 3/2007 | Larnholm | B01D 45/16 55/319 |
| 2007/0137154 | A1 * | 6/2007 | Agnello | B01D 45/08 55/440 |
| 2008/0290532 | A1 * | 11/2008 | Kooijman | B01D 1/305 261/108 |
| 2009/0078118 | A1 * | 3/2009 | Kooijman | B01D 1/305 96/207 |
| 2015/0266145 | A1 * | 9/2015 | Valsler | B01D 45/08 55/437 |
| 2015/0306523 | A1 * | 10/2015 | Ball, IV | C10G 33/06 210/512.1 |

* cited by examiner

INLET DIVERTER

CROSS-REFERENCE TO RELATED APPLICATION(S)

This application is a continuation of U.S. patent application Ser. No. 15/439,060, filed Feb. 22, 2017, entitled "INLET DIVERTER," which is a continuation of U.S. patent application Ser. No. 15/366,501, filed Dec. 1, 2016, entitled "INLET DIVERTER," the disclosure of which are incorporated herein by reference in their entirety.

TECHNICAL FIELD

The systems and methods described below relate to separation apparatuses for separating multiphase mixtures. More particularly, the systems and methods relate to vaned separation apparatuses.

BACKGROUND

The oil and gas industry requires multiphase mixtures to be separated in preparation for downstream processing. Some separation techniques utilize separation apparatuses positioned within a separation vessel. A multiphase mixture is directed into the separation vessel such that it contacts the separation apparatuses. A certain level of separation is achieved by forcing the multiphase mixture through the separation apparatuses. An issue with some separation techniques, however, is that the separation of the multiphase mixture is insufficient and/or inefficient. Additionally, the configuration of the separation apparatuses may lead to undesirable liquid shearing and/or aerosolization, both of which may impede the separating ability of the separation apparatuses and may adversely affect downstream processing.

SUMMARY

In accordance with one embodiment, an inlet diverter for separating a multiphase mixture is provided. The inlet diverter comprises at least one inlet and a vane grouping positioned proximate to the at least one inlet. The vane grouping comprises a plurality of vanes each positioned beside each other. Each vane of the plurality of vanes has a leading portion extending outwardly in a first direction and a trailing portion extending outwardly in a second direction. Additionally, a curved vane portion extends between each leading portion and trailing portion and comprises an inner vane surface and an outer vane surface. At least a portion of the inner vane surface and the outer vane surface are curved. The leading portion and the trailing portion of each vane of the plurality of vanes extend generally towards the at least one inlet.

In accordance with another embodiment, an inlet diverter is provided that comprises a vane assembly having a plurality of first vanes and a plurality of second vanes. Each of the first and second vanes has a leading portion and a curved trailing portion. The leading portions of the first vanes are laterally adjacent and substantially parallel to the leading portions of the second vanes. Additionally, each of the curved trailing portions of the first and second vanes define a respective degree of curvature. The degree of curvature of each of the curved trailing portions of the first and second vanes is more than about 135 degrees.

In accordance with yet another embodiment, an inlet diverter for separating a multiphase mixture is provided that comprises an inlet and a vane assembly defining a plurality of first flow passages and a plurality of second flow passages. Each of the first flow passages and the second flow passages define a passage entrance and a passage exit. The first flow passages each define a curved portion that terminates at the passage exit. The second flow passages each define a curved portion that terminates at the passage exit. Additionally, each of the passage entrances and the passage exits are oriented towards the inlet.

In accordance with still yet another embodiment, a method of separating a multiphase mixture is provided. The method comprises receiving a multiphase flow through an inlet and contacting the multiphase flow with a leading portion of a plurality of vanes of a vane assembly. The plurality of vanes are laterally spaced apart to define a plurality of passages that each comprise a curved portion. The method also comprises routing the multiphase flow through the curved portions of the plurality of passages and discharging at least a portion of the multiphase flow from the vane assembly towards the inlet.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Various non-limiting embodiments of the present disclosure will now be described to provide an overall understanding of the principles of the structure, function, and use of the disclosed inlet diverters. One or more examples of these non-limiting embodiments are illustrated in the selected examples disclosed and described in detail with reference made to FIGS. 1-10 in the accompanying drawings. The examples discussed herein are examples only and are provided to assist in the explanation of the apparatuses, systems and methods described herein. None of the features or components shown in the drawings or discussed below should be taken as mandatory for any specific implementation of any of these apparatuses, systems or methods unless specifically designated as mandatory. For ease of reading and clarity, certain components or methods may be described solely in connection with a specific figure. In this disclosure, any identification of specific techniques or arrangements is either related to a specific example presented or is merely a general description of such a technique, arrangement, and so forth. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to the disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that, unless otherwise specified or required by context, any explicit or implicit ordering of steps performed in the execution of a method does not imply that those steps must be performed in the order presented but, instead, may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

The present disclosure generally relates to apparatus, systems and methods for separating a multiphase mixture into separate components. The type of separation facilitated by the inlet diverters described herein can vary based on the constituents of the multiphase mixture being processed. As such, some inlet diverters in accordance with the present disclosure separate gaseous components and one or more liquid components and/or separate one or more liquid components from other liquid components. Additionally, some inlet diverters in accordance with the present disclosure additionally or alternatively separate solid components from liquid and/or gaseous components. As described in more detail below, the inlet diverters described below can provide, without limitation, separation of gas from a liquid emulsion (i.e., of oil and water), separation of water from oil, separation of different liquids having different specific gravities, and/or separation of solids from liquids. In some oil and gas implementations, an inlet diverter can be mounted inside a vessel, sometimes referred to as a separation vessel, into which a well stream is flowed after it leaves a producing well. The well stream is directed into the inlet diverter to separate the well stream into various constituent components to aid in the processing of the well stream.

Inlet diverters in accordance with the present disclosure can enhance the separation of gaseous components from liquid streams through the use of curved vanes that serve to route a multiphase mixture flowing through the inlet diverter. The configuration of the inlet diverters described herein can also provide for efficient separation by reducing shear stress on the incoming liquid droplets, as the inlet stream flow rate is gradually slowed thereby minimizing liquid droplet collision frequency and velocity. Such configuration can provide for gas/liquid separation as well as separating liquids of different specific gravities and/or separating solid components from a liquid stream. The vane geometry, orientation, and spacing is configured such that the vast majority of incoming liquid droplets are redirected and gradually de-accelerated until they either drop to a liquid pad due to gravity, impact on an internal surface or another droplet without splattering or breaking up, or proceed downstream through the vane passages.

When positioned in a vessel, the inlet diverter can be positioned such that the multiphase mixture is redirected back towards a head of the separation vessel upon exiting the inlet diverter. In using the curved vanes described in more detail below, the flow rate of the multiphase mixture can beneficially be slowed and the liquid droplet residence time can be increased. Slowing the flow rate also reduces the speed at which droplets impinge on the vessel walls, which can reduce aerosolization. Also, should components of the multiphase mixture collide with the vane surfaces, they collide at relatively oblique angles and at lower relative speeds, which can beneficially increase the likelihood that the droplets coalesce into larger droplets, or remain in contact with the vane surface. Such a configuration can reduce droplet breakup which, in turn, can preserve larger droplet sizes that are more likely to settle to a liquid bed below the inlet diverter due to gravity.

Furthermore, in accordance with various embodiments, leading edges of the vanes can interact with the incoming multiphase mixture stream in such a way that large incoming liquid droplet sizes can generally be preserved. By preserving large droplet sizes, the separation of gas phases from liquid phases can occur faster, more efficiently, and aerosolization of the liquid mix can be reduced as compared to conventional arrangements.

After exiting the inlet diverter, the large droplets can collide with the vessel head and then drop into the liquid pool inside the separator vessel. The gaseous components (such as natural gas), now virtually free of oil and water droplets, can continue through the separator vessel to they can eventually be removed from the vessel through an exit.

FIG. 1 depicts a front isometric view of an example inlet diverter 100 in accordance with one embodiment, FIG. 2 depicts a rear isometric exploded view of the inlet diverter 100, and FIG. 3 depicts the inlet diverter 100 with a first plate 130 removed for clarity of illustration. Referring now to FIGS. 1-3, the inlet diverter 100 in the illustrated embodiment has a vane assembly 150 (FIG. 2) comprising a plurality of vanes 110, 112, 114, 140, 142, 144 that can be positioned beside each other, such as in a nested arrangement. The vane assembly 150 is positioned proximate to an inlet 124, with the inlet 124 being the general area of the inlet diverter 100 through which multiphase mixture is introduced so that it can enter the vane assembly 150. Thus, while the size and orientation of the inlet 124 may vary, it serves to route an incoming multiphase mixture into the vane assembly 150.

As shown in FIG. 3, the vane assembly 150 of the illustrated embodiment includes a first vane grouping 102 and a second vane grouping 122. In some embodiments, the first vane grouping 102 is generally symmetrical to and a mirror image of the second vane grouping 122, as is shown in FIGS. 1-3. Each of the vane groupings 102, 122 has a plurality of vanes that are vertically positioned beside and spaced laterally from each other. In the illustrated embodiment, the first vane grouping 102 includes an innermost vane 110, an inner vane 112, and an outermost vane 114. Similarly, the second vane grouping 122 includes an innermost vane 140, an inner vane 142, and an outermost vane 144. As is to be appreciated upon consideration of the present disclosure, the number of vanes in the vane assembly 150 may vary. For instance, while the vane assembly 150 is shown to include six vanes, in some embodiments the vane assembly 150 may include more than six vanes or less than six vanes. Additionally, while the first vane grouping 102 is shown to have the same number of vanes as the second vane grouping 122, in some configurations, the number of vanes in the first vane grouping 102 may differ from the number of vanes in the second vane grouping 122.

The illustrated inlet diverter 100 also has a diverter plate 146 flanking the first vane grouping 102 and another diverter plate 148 flanking the second vane grouping 122. While the diverter plates 146, 148 do not have curved sections, these plates can assist in routing the flow of a multiphase mixture towards the vane assembly 150. The diverter plates 146, 148 can also assist in defining various flow passages, as described in more detail below.

Figure 4:
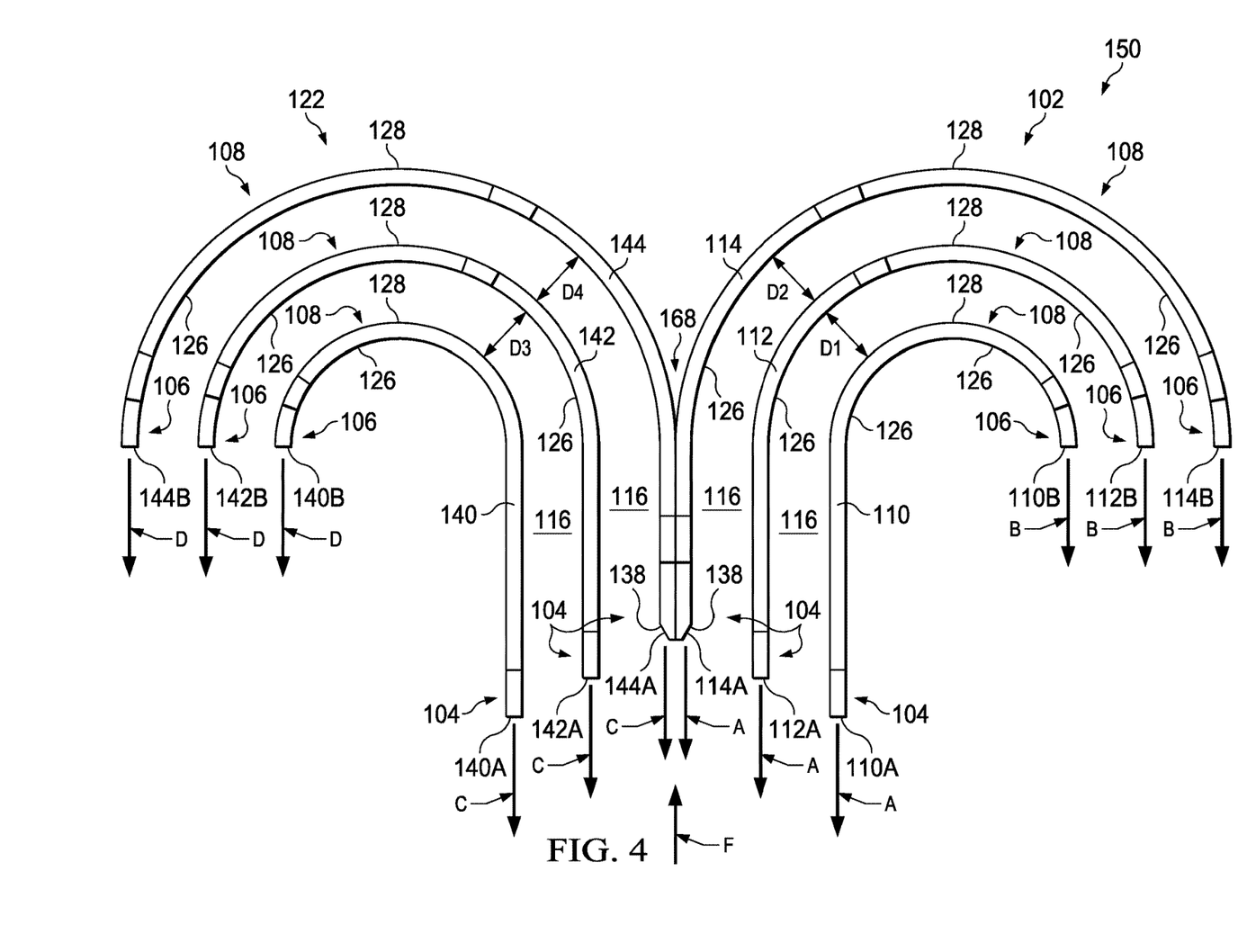
FIG. 4 depicts a top view of an example vane assembly.

FIG. 4 depicts a top view of the vane assembly 150 of the inlet diverter 100. Each vane (e.g., 110, 112, 114, 140, 142, 144) of the vane assembly 150 can have a leading portion 104 that extends outwardly. The leading portions 104 of the first vane grouping 102 are shown to extend in direction A. The leading portions 104 of the second vane grouping 122 are shown to extend in direction C. Each vane of the vane assembly 150 can have also have a trailing portion 106 that extends outwardly. The trailing portions 106 of the first vane grouping 102 are shown to extend in direction B. The trailing portions 106 of the second vane grouping 122 are shown to extend in direction D. As shown, the leading portions 104 and the trailing portions 106 of the illustrated embodiment each generally extend back towards the inlet 124, such that they are substantially parallel to each other and parallel to the direction of the flow of a multiphase mixture (shown as flow F on FIG. 4). In other embodiments, the leading portions 104 and/or trailing portions 106 may generally extend back towards the inlet but not be substantially parallel to each other.

Figure 3:
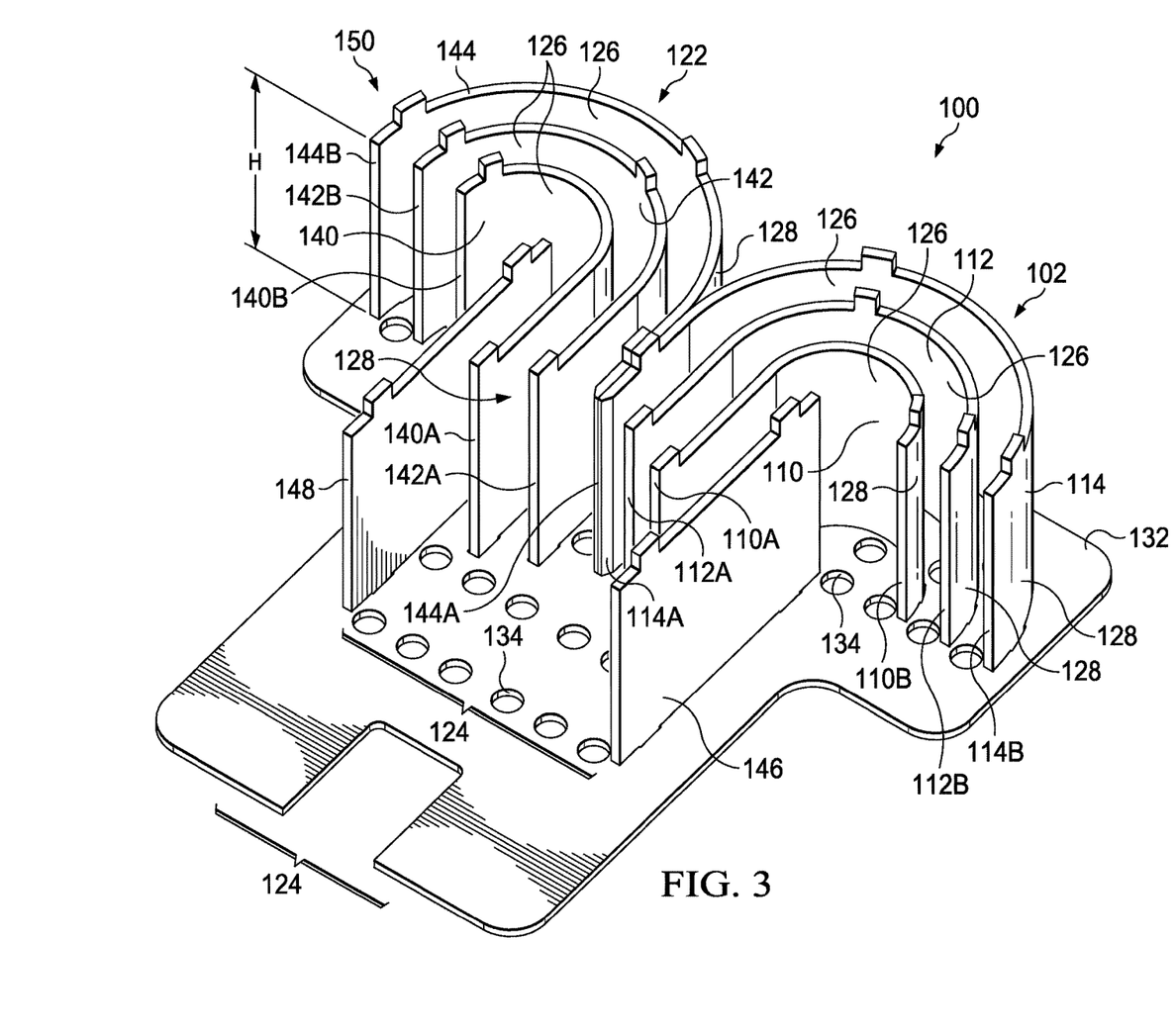
FIG. 3 depicts the inlet diverter of FIG. 1 with components removed for clarity of illustration.

As shown in FIGS. 3-4, each leading portion 104 can have a leading edge that faces the incoming multiphase mixture stream. In particular, innermost vane 110 has a leading edge 110A, inner vane 112 has a leading edge 112A, and outermost vane 114 has a leading edge 114A. Similarly, innermost vane 140 has a leading edge 140A, inner vane 142 has a leading edge 142A, and outermost vane 144 has a leading edge 144A. The orientation and configuration of the leading edges 110A, 112A, 114A, 140A, 142A, 144A can vary. For instance, in the illustrated embodiment, leading edges 110A and 140A include a chamfer 138. In other embodiments, other leading edges may also include a chamfer or a bevel, may be rounded, or otherwise be shaped to enhance the operation of the inlet diverter 100. The leading edges 110A, 112A, 114A, 140A, 142A, 144A can be structured to interact with an incoming stream of a multiphase mixture such that large incoming liquid droplet sizes can generally be preserved. By preserving large droplet sizes, the separation of gas from liquid phases can occur faster, more efficiently, and aerosolization of the liquid mix is minimized.

Each trailing portion 106 of the vanes in the vane assembly 150 can have a trailing edge. As such, innermost vane 110 has a trailing edge 110B, inner vane 112 has a trailing edge 112B, and outermost vane 114 has a trailing edge 114B. Similarly, innermost vane 140 has a trailing edge 140B, inner vane 142 has a trailing edge 142B, and outermost vane 144 has a trailing edge 144B. While trailing edges 110B, 112B, 114B, 140B, 142B, 144B are shown as being flat, this disclosure is not so limited.

The relative position of the leading portions 104 of adjacent vanes may differ from the relative position of the trailing portions 106. In particular, the leading edges 110A, 112A, 114A and the leading edges 140A, 142A, 144A can be arranged in a variety of different configurations, as may be desired, to enhance operation of the inlet diverter 100. In the illustrated embodiment, the leading edges 110A, 112A, 114A of the first vane grouping 102 are shown to be obliquely aligned with respect to each other. As such, the leading edge 114A of the outermost vane 114 is more distal to the inlet 124 than the leading edge 110A of the inner vane 110. Similarly, the leading edges 140A, 142A, 144A of the second vane grouping 122 are shown to be obliquely aligned with respect to each other. As such, the leading edge 144A of the outermost vane 144 is more distal to the inlet 124 than the leading edge 140A of the inner vane 140. The leading edges 110A, 112A, 114A of the first vane grouping 102 and the leading edges 140A, 142A, 144A of the second vane grouping 122 collectively define a V-shape extending into the vane assembly 150.

The trailing edges 110B, 112B, 114B, 140B, 142B, 144B of each of the trailing portions 106 are shown to be laterally aligned with respect to each other in the illustrated embodiment. However, similar to the leading edges 110A, 112A, 114A, 140A, 142A, 144A, the trailing edges 110B, 112B, 114B, 140B, 142B, 144B can also be offset with respect to each other, as described in more detail below with reference to FIG. 10.

Each of the vanes of the vane assembly 150 can have a curved vane portion 108 that extends between the respective leading portion 104 and trailing portion 106. In particular, each of the vanes can have an inner vane surface 126 and an outer vane surface 128 and at least a portion of the inner vane surface 126 and the outer vane surface 128 are curved. The curvature of these surfaces allows the vanes of the vane assembly 150 to slow the flow of the multiphase mixture and redirect it back towards the inlet 124 upon discharge. The vanes of the first vane grouping 102 curve outwardly in a first outward direction and the vanes of the second vane grouping 122 curve outwardly in a second outward direction. In the illustrated embodiment, the first outward direction is opposite to the second outward direction.

In some embodiments, the curved vane portions 108 comprise at least a portion or all of the respective leading portions 104. Alternatively or additionally, the curved vane portions 108 can comprise at least a portion or all of the respective trailing portions 106. In the illustrated embodiment, the leading portion 104 is generally flat and extends tangentially from the curved vane portion 108 towards the inlet 124. As such, a multiphase mixture flowing through the inlet 124 of the inlet diverter 100 will first encounter the leading portions 104 of the vanes which then smoothly transition into the curved vane portions 108.

In some embodiments, at least a portion of the outer vane surface 128 of the outermost vane 114 and at least a portion of the outer vane surface 128 of the outermost vane 144 are contacting and define a contacting zone 168 (FIG. 4) that is impervious to the multiphase mixture. The contacting zone 168 can include the leading portion 104 of the outermost vane 114 and the leading portion 104 of the outermost vane 144. The proximal portion of the contacting zone 168 comprises the chamfers 138 to minimize liquid shearing and preserve droplet size. The use of the contacting zone 168 can assist in ensuring the entire multiphase mixture is routed through one of the first and second vane groupings 102, 122.

Each vane of the first vane grouping 102 is spaced apart from an adjacent vane by an offset distance in order to create flow passages. In the illustrated embodiment, as shown in FIG. 4, the innermost vane 110 is spaced apart from the inner vane 112 by an offset distance D1. The outermost vane 114 is spaced apart from the inner vane 112 by an offset distance D2. Similarly, each vane of the second vane grouping 122 is spaced apart from an adjacent vane by an offset distance. In the illustrated embodiment, the innermost vane 140 is spaced apart from the inner vane 142 by an offset distance D3. The outermost vane 144 is spaced apart from the inner vane 142 by an offset distance D4. As is shown, each offset distance D1, D2, D3, and D4 can be substantially equal, however this disclosure is not so limited. In some embodiments, for instance, D1 and D3 may be substantially equal and D2 and D4 may be may be substantially equal, but D1 and D3 may differ from D2 and D4. In other embodiments, for instance, D1 and D2 may be substantially equal and D3 and D4 may be substantially equal, but D1 and D2 may differ from D3 and D4. In other embodiments, for instance, D1 and D4 may be substantially equal and D2 and D3 may be may be substantially equal, but D1 and D4 may differ from D2 and D3. One or more of the offset distances D1, D2, D3, and D4 can be in the range of about 0.75 inches and about 2.0 inches. Further, the offset distance between adjacent vanes may vary at different points along the vanes. For instance, in some embodiments, the offset distance can increase from the leading portion 104 towards the trailing portion 106 (i.e., increase in width by about 10% to about 40% from entrance to exit) to aid in reducing the velocity of the flow rate, an example of which is described in more detail below with reference to FIG. 9. In other embodiments, the offset distance can decrease from the leading portion 104 towards the trailing portion 106.

As shown in FIG. 3, each vane of the vane assembly 150 has a height (shown as height H). In accordance with some embodiments, the height (H) can be in the range of about 3.0 inches and about 8.0 inches. While the inlet diverter 100 shows the vanes having a constant height along their entire length, this disclosure is not so limited. For instance, the height of each of the plurality of vanes can vary from the leading portion 104 towards the trailing portion 106. In some embodiments, the height of the vanes may decrease from the leading portion 104 towards the trailing portion 106. In other embodiments, the height (H) of the vanes may increase from the leading portion 104 towards the trailing portion 106.

Figure 1:
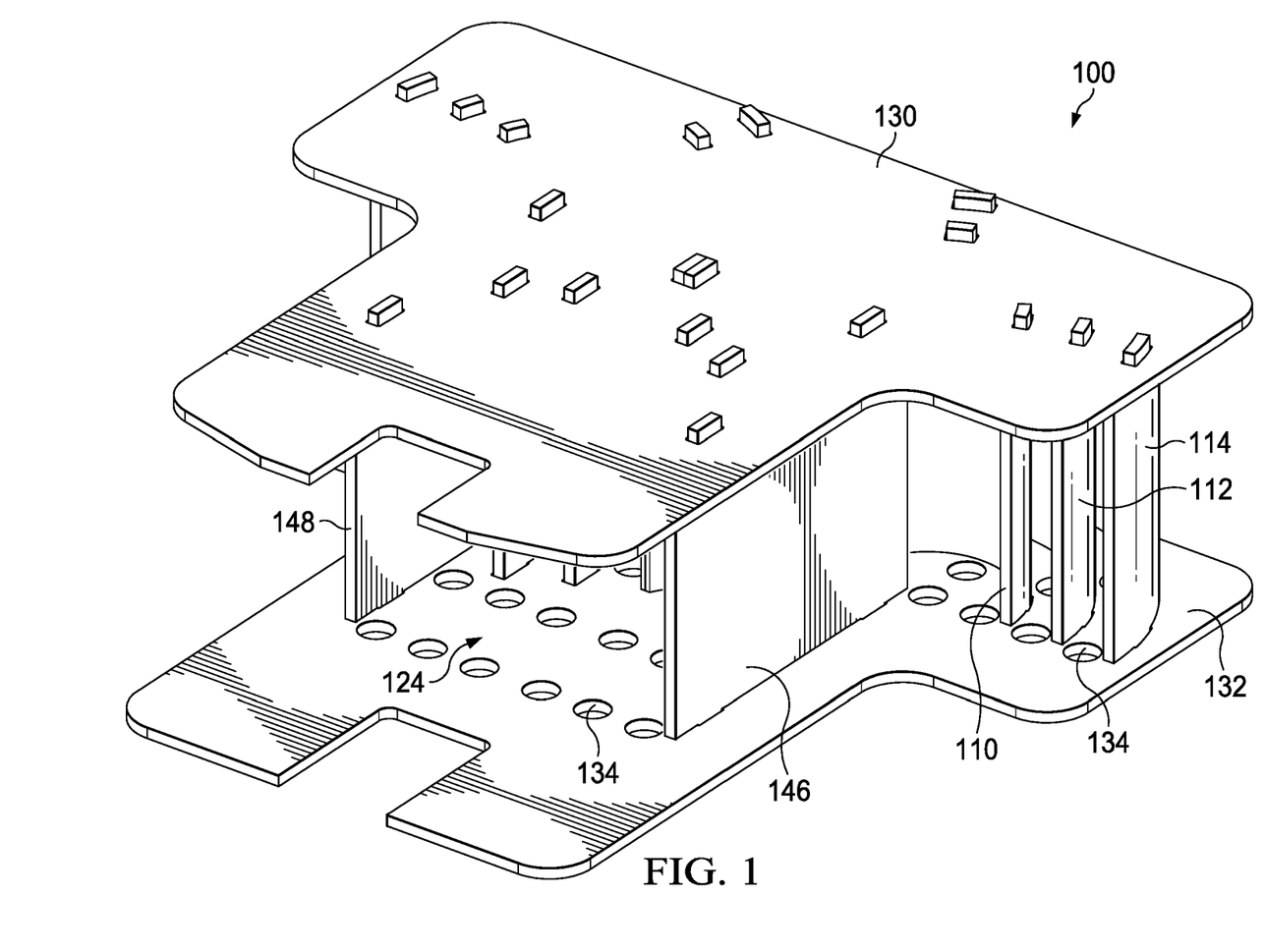
FIG. 1 is a front isometric view of an inlet diverter in accordance with one embodiment.
Figure 2:
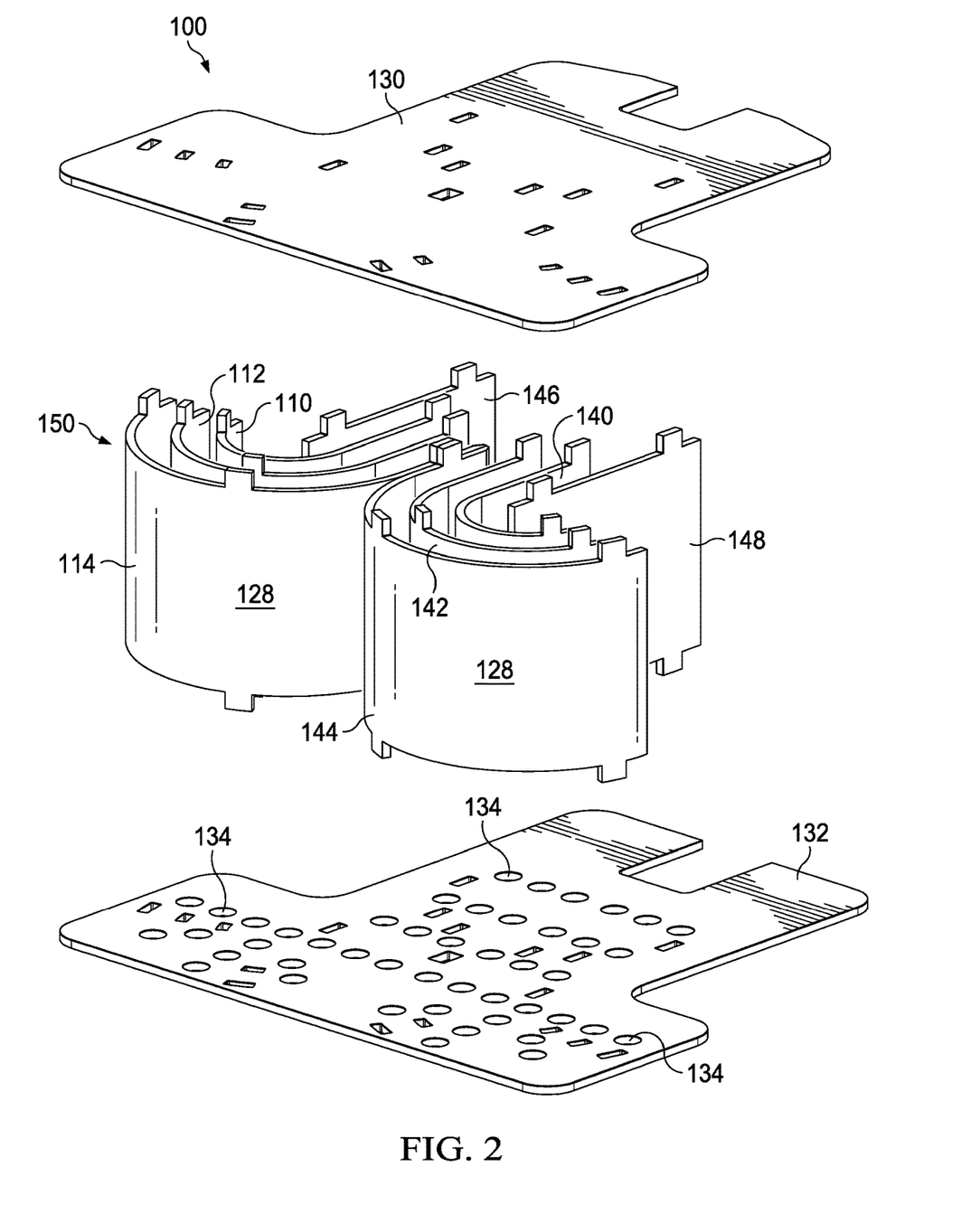
FIG. 2 depicts a rear isometric exploded view of the inlet diverter of FIG. 1.

As shown in the exploded view in FIG. 2, the inlet diverter 100 can include a first plate 130 positioned on a first side (e.g., top side) of the vane assembly 150 and a second plate 132 positioned on a second side (e.g. bottom side) of the vane assembly 150. In some configurations, the first and second plates 130, 132 can be substantially perpendicular to each of the vanes of the vane assembly 150 and substantially parallel to each other, however this disclosure is not so limited. For instance, the first and second plates 130, 132 can be angled relative to each other, such as to accommodate a vane assembly having bell-shaped vanes or otherwise having non-uniform heights. In some embodiments, the first and second plates 130, 132 are each slanted towards each other, such that they are each angled relative to a horizontal plane. The first and second plates 130, 132 can inwardly slant from the inlet side of the inlet diverter 100 toward the other side of the inlet diverter. Additionally, the first and second plates 130, 132 can be angled relative to some or all of the vanes of the vane assembly 150. The first and second plates 130, 132 can either be separate plates, as shown, or components of a housing or other structure that surrounds the inlet diverter 100. While one exemplary shape is illustrated, the first and second plates 130, 132 can have any suitable shape, such as to be accommodated into an associated vessel, for instance. The first and second plates 130, 132 can be planar, as shown, or be curved, domed, ridged, among other geometries. In any event, the first and second plates 130, 132 can be coupled to the vanes using any suitable attachment technique. In the illustrated embodiment, each vane has tabs that are received into corresponding holes in the plates. Once the tabs are inserted into the holes, they can be welded or otherwise fixedly attached.

In some embodiments, at least one of the first and second plates 130, 132 defines a plurality of apertures 134. The apertures 134 can allow any entrained particulates, such as sand or other debris that may collect between vanes of the vane assembly 150 during operation, to fall through the apertures 134 so that it does not collect in the passages between the vanes. The apertures 134 can be shaped, sized, and arranged such that a pressure drop is induced from above the aperture (i.e. internal to the inlet diverter 100) to below the aperture (i.e., external to the inlet diverter 100) when the multiphase mixture is flowing through the vane assembly 150. Sand and debris can be pulled out through the apertures 134 during operation due to the pressure differential between the two sides of the second plate 132.

Figure 5:
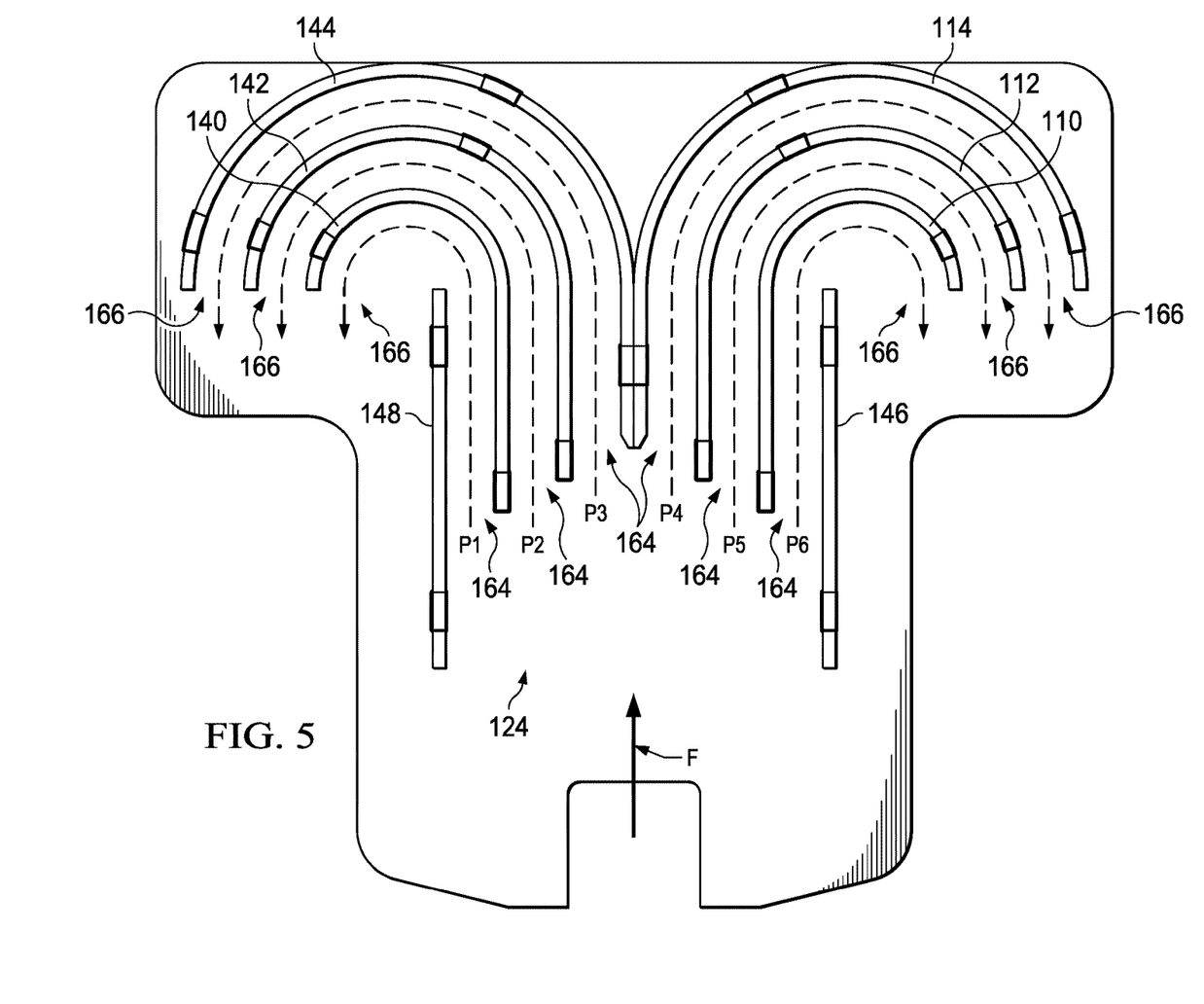
FIG. 5 depicts a bottom view of the inlet diverter of FIG. 1 with components removed for clarity of illustration.
Figure 6:
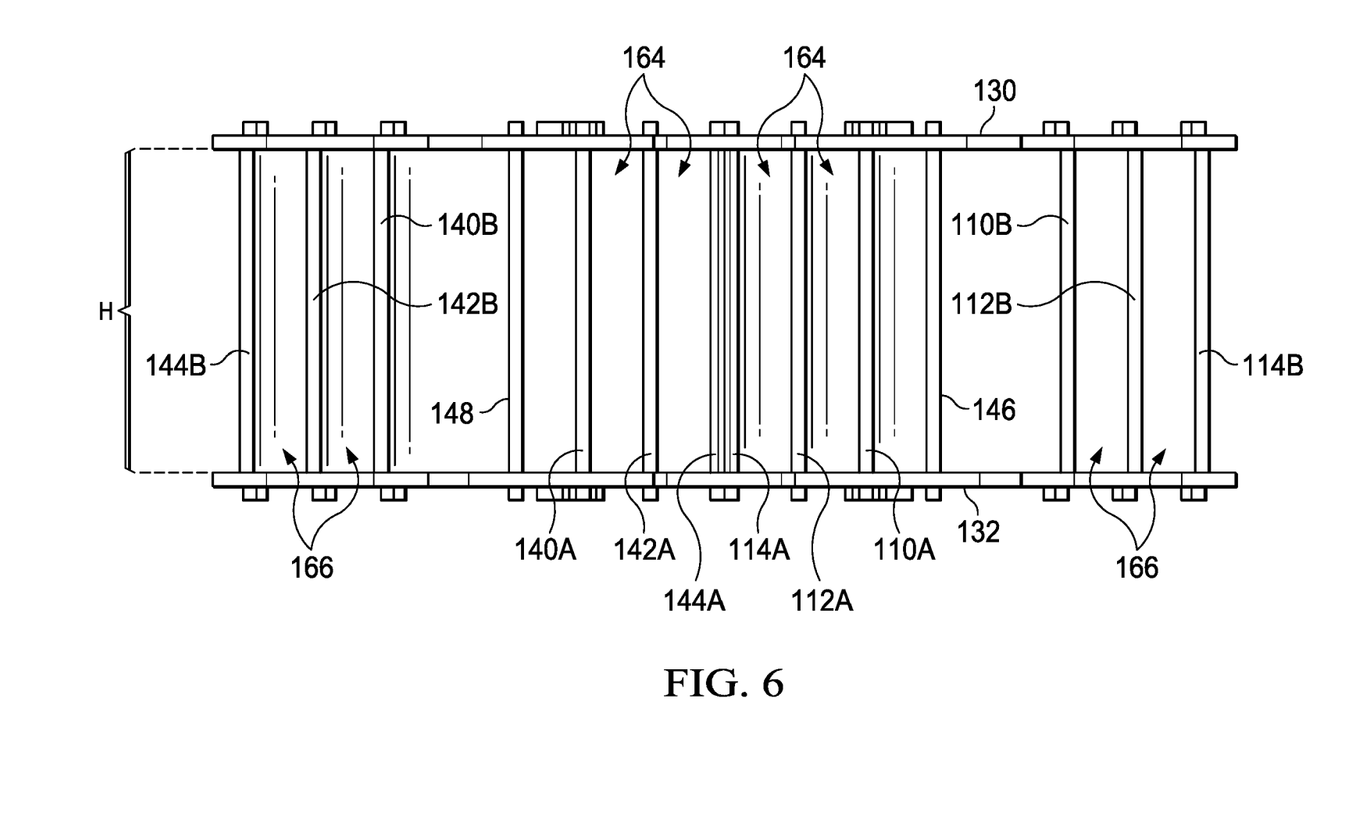
FIG. 6 depicts a side view of the inlet diverter, as viewed from an inlet.

FIG. 5 depicts a bottom view of the inlet diverter 100 with the second plate 132 removed for clarity of illustration and FIG. 6 depicts a side view of the inlet diverter 100. FIG. 5 depicts a plurality of flow passages P1, P2, P3, P4, P5, P6 defined by the vanes of the inlet diverter 100. In the illustrated embodiments, flow passages P1, P2, and P3 are defined by the diverter plate 148, the innermost vane 140, the inner vane 142, and the outermost vane 144. Flow passages P4, P5, and P6 are defined by the outermost vane 114, the inner vane 112, the innermost vane 110, and the diverter plate 146. As is to be appreciated, while six flow paths are illustrated in FIG. 5, this disclosure is not so limited, as the number of flow paths in the inlet diverter will be determined based on the total number of vanes utilized. The flow passages P1, P2, P3, P4, P5, P6 can have varying radiuses of curvature. For instance, flow passages P3 and P4 can each have a radius of curvature that is greater than the radius of curvature of flow passages P1 and P6. The radius of curvature of flow passages P2 and P5 can be between the radius of curvature of flow passages P1-P6 and flow passages P3-P4.

Each of the flow passages P1, P2, P3, P4, P5, P6 can have a passage entrance 164 (FIG. 6) and a passage exit 166 (FIG. 6). The width of the passage entrances 164 and the passage exits 166 can be defined by the offset distances between adjacent vanes. As such, in some embodiments the passage exits 166 may be wider or narrower than the passage entrances 164. As shown in FIG. 5, as the flow passages extend from the passage entrance 164 to the passage exit 166 they curve outwardly. While FIG. 5 depicts a linear portion positioned between the passage entrance 164 and the curved portion of the passage, this disclosure is not so limited. For instance, in some embodiments, the entire flow passage is curved. In other examples, the first portion of the flow passage is curved and a trailing portion of the passage is linear. In other examples, the first portion of the flow passage is linear, the trailing portion of the passage is linear, and a curved portion connects them.

Figure 7:
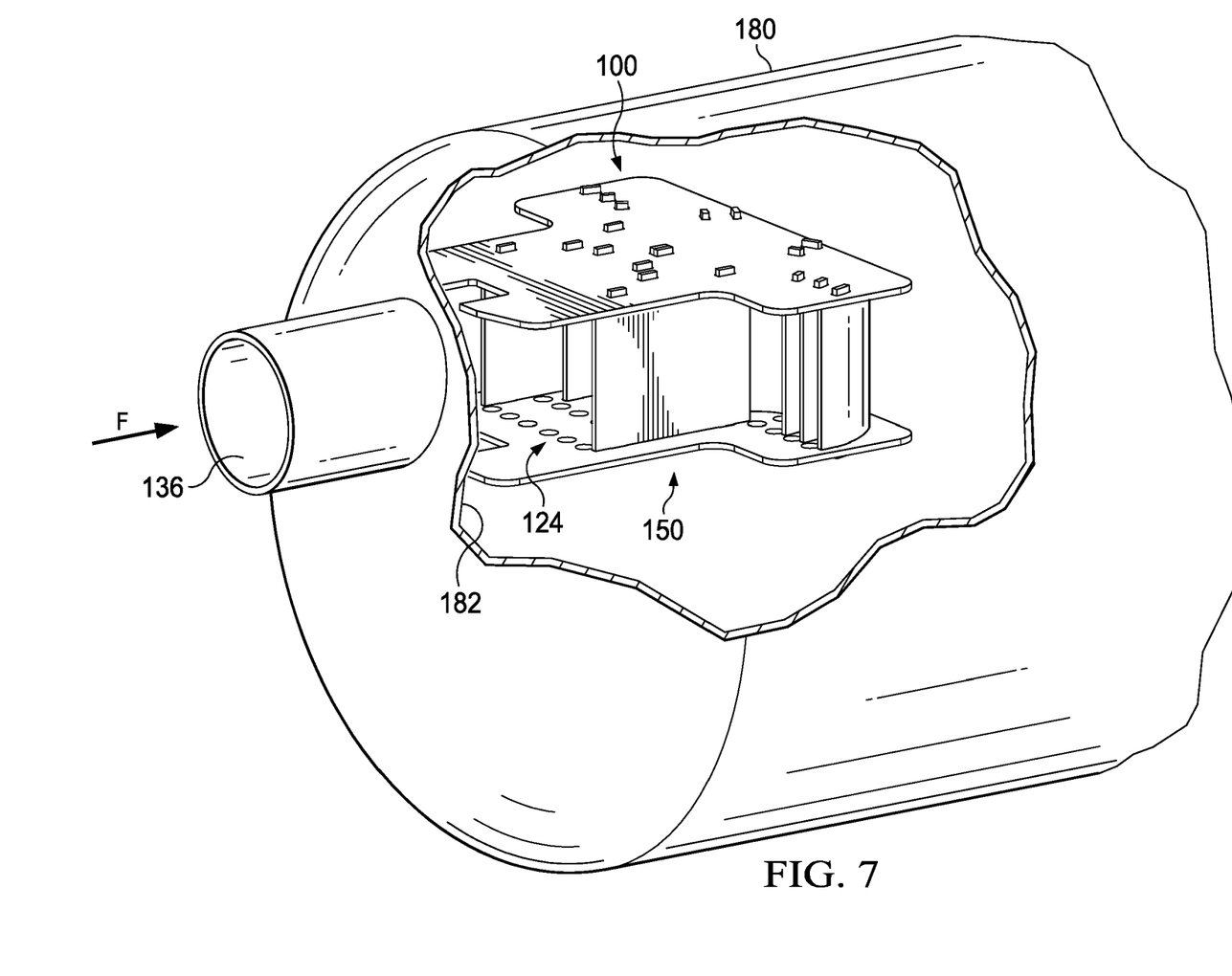
FIG. 7 depicts a partial cutaway view of an example vessel that is housing the inlet diverter of FIG. 1.

FIG. 7 shows a partial cutaway view of a vessel 180 having a vessel inlet 136 through which a multiphase mixture can be flowed (indicated by flow F). The inlet diverter 100 is positioned proximate to a head of the vessel 180 such that, as the multiphase mixture is fed through the vessel inlet 136, it flows through the inlet 124 of the inlet diverter 100 and into the vane assembly 150. As described above, the flow paths of the inlet diverter 100 travel through the inlet diverter 100 and ultimately discharge the multiphase mixture out of the inlet diverter 100 and towards an inner wall 182 of the vessel 180 that is proximate the head of the vessel 180. Further, while the vessel inlet 136 of the vessel 180 is generally aligned with the inlet 124 of the inlet diverter 100, this disclosure is not so limited. For instance, in some vessel configurations the vessel inlet 136 may be positioned on top or at a side of the vessel 180. In such configurations, internal piping can be utilized to route the flow of the multiphase mixture towards the inlet 124 of the inlet diverter 100. Further, the size of the vessel 180 can vary based on application. In some embodiments, for instance, the vessel 180 is a 24-inch vessel. In other embodiments, the vessel is a 30-inch vessel. As is to be appreciated, this disclosure is not limited to any particular vessel size, shape, type, or arrangement.

A multiphase mixture can be introduced into the vessel 180 through the vessel inlet 136 and then directed into the inlet 124 of the inlet diverter 100. The constituents of the multiphase mixture introduced through the inlet diverter 100 can vary based on application and can even vary during operation. For instance, in some operational environments, the multiphase mixture is a multi-phase emulsion including multiple immiscible liquids. The multiphase mixture can also include various particulates that need to be separated from liquid. Based on the constituents of the multiphase mixture, the order or sequence of the separation that occurs as the multiphase mixture flows through the passages can vary. In any event, during operation, separation of the multiphase mixture can include, for example, separation of solids from liquids, gases from liquids, and/or liquids from other liquids.

The operation of the inlet diverter 100 in accordance with one operational embodiment will now be described. For the purposes of illustration, the operation described below is in the context of a hydrocarbon well stream, such as an output from a gas or oil well, for instance. A hydrocarbon well stream can be a multiphase flow comprising natural gas, oil, water, among a variety of other constituents. The vessel 180 schematically depicted in FIG. 7 can be any suitable vessel, such as a standalone unit, a component of a gas production unit (GPU) positioned at a well site, or part of a well pad production system, for instance.

Once the hydrocarbon well stream is introduced into the vessel 180 from the well site, the configuration of the vane assembly 150 can beneficially reduce the hydrocarbon well stream's velocity and to increase the residence time of the hydrocarbon well stream inside the vessel 180. Reducing the speed of the flow and increasing the residence time both can improve the separation processes, particularly for hydrocarbon well streams having a high percentage of methane or other gas. Components of the inlet diverter 100 can also maintain and encourage the coalescence of similar liquid components (e.g., crude oil or water), while minimizing the opportunity to break liquid droplets in to many smaller droplets. The structure of the inlet diverter 100 also beneficially serves to reduce the aerosolization of the water or hydrocarbon liquids into a hydrocarbon gas phase.

Upon being introduced into the vessel 180, the hydrocarbon well stream first contacts the leading portions 104 of a plurality of vanes of a vane assembly 150. As shown in the illustrated embodiments, the leading portion 104 can be substantially parallel to the hydrocarbon well stream flow in order to reduce the sheer of liquid components and maintain relatively large liquid droplet size. The flow volume and flow rate of the hydrocarbon well stream introduced into inlet diverter 100 can vary. For instance, in some environments, the inlet diverter 100 can process a relatively high volume of a flowing multiphase mixture, such as hydrocarbon well streams having flowrates ranging from 0.5 to 22 million standard cubic feet per day (MMCFD) MMCFD gas; 1 to 600 blue barrels per day (bbl/day) oil; and 5 to 600 bbl/d water. As is to be readily appreciated, however, the particular flowrates can vary during use. Depending upon the velocities with which the gas(es) and liquid(s) are introduced to the vessel 180 relative to one another, the flow into the vessel 180 may also take on any one of several forms, such as slug, annular, churn, or mist, for example.

Still referring to an example operational environment, the hydrocarbon well stream is separated and collectively routed through the plurality of passages P1, P2, P3, P4, P5, P6 (FIG. 5) to route the multiphase flow through the curved portions of the passages. The curved vanes defining the curved portions can gently redirect the hydrocarbon well stream in an effort to avoid additional sheer or turbulence while maintaining relatively large liquid droplet sizes. As provided above, in some configurations, some or all of the passages can also increase in width from the entrance of the passage to the exit of the passage. In such cases, as the width of the passage increases, the volume of the passage relative to the volume of the flowing hydrocarbon well stream increases. Accordingly, the velocity of the flowing mixture is further reduced as it travels through the passage. The plurality of apertures 134 describe above can allow solid particles to drop out of the inlet diverter 100, as well as beneficially reduce the probability of solid material building up in the passages P1, P2, P3, P4, P5, P6, which may impede flow.

After traveling through the passages P1, P2, P3, P4, P5, P6, the multiphase mixture is then discharged from the vane assembly 150 and towards the inlet 124 such that the hydrocarbon well stream is discharged toward the head of the vessel 180. With the multiphase mixture largely directed at the head or surface of the vessel 180, the conserved larger liquid components are allowed to continue to coalesce and with gravity, move down the inner surface of the vessel 180 into a liquid pool inside the vessel 180. The gaseous components of the multiphase mixture are maintained above the liquid pool. These gaseous components (such as natural gas), now virtually free of liquid droplets, can continue through the vessel 180 for removal from the vessel 180 for further downstream processing. It is noted that while the inner wall 182 is shown as being at the head of the vessel 180, in other embodiments the discharged multiphase mixture can be directed towards an inner sidewall, or other wall or structure of the vessel 180. In any event, by slowing the flow of the multiphase mixture prior to discharging it from the inlet diverter 100, the speed at which droplets impact the inner wall 182 of the vessel 180 can be reduced, which further reduces aerosolization.

Figures 8, 9:
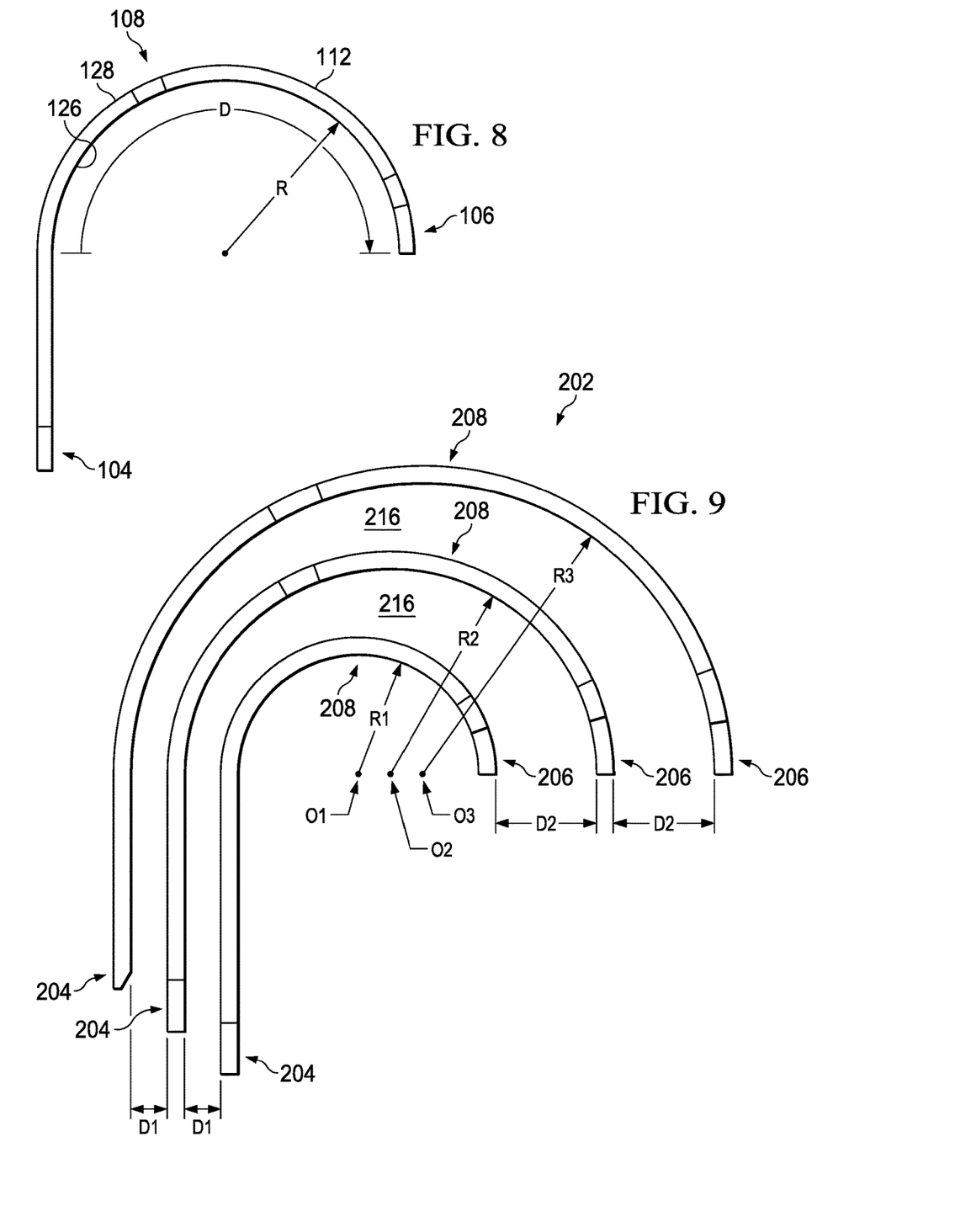
FIG. 8 depicts an inner vane of the inlet diverter of FIG. 1.
FIG. 9 depicts an example vane grouping in accordance with another non-limiting embodiment.
Figure 10:
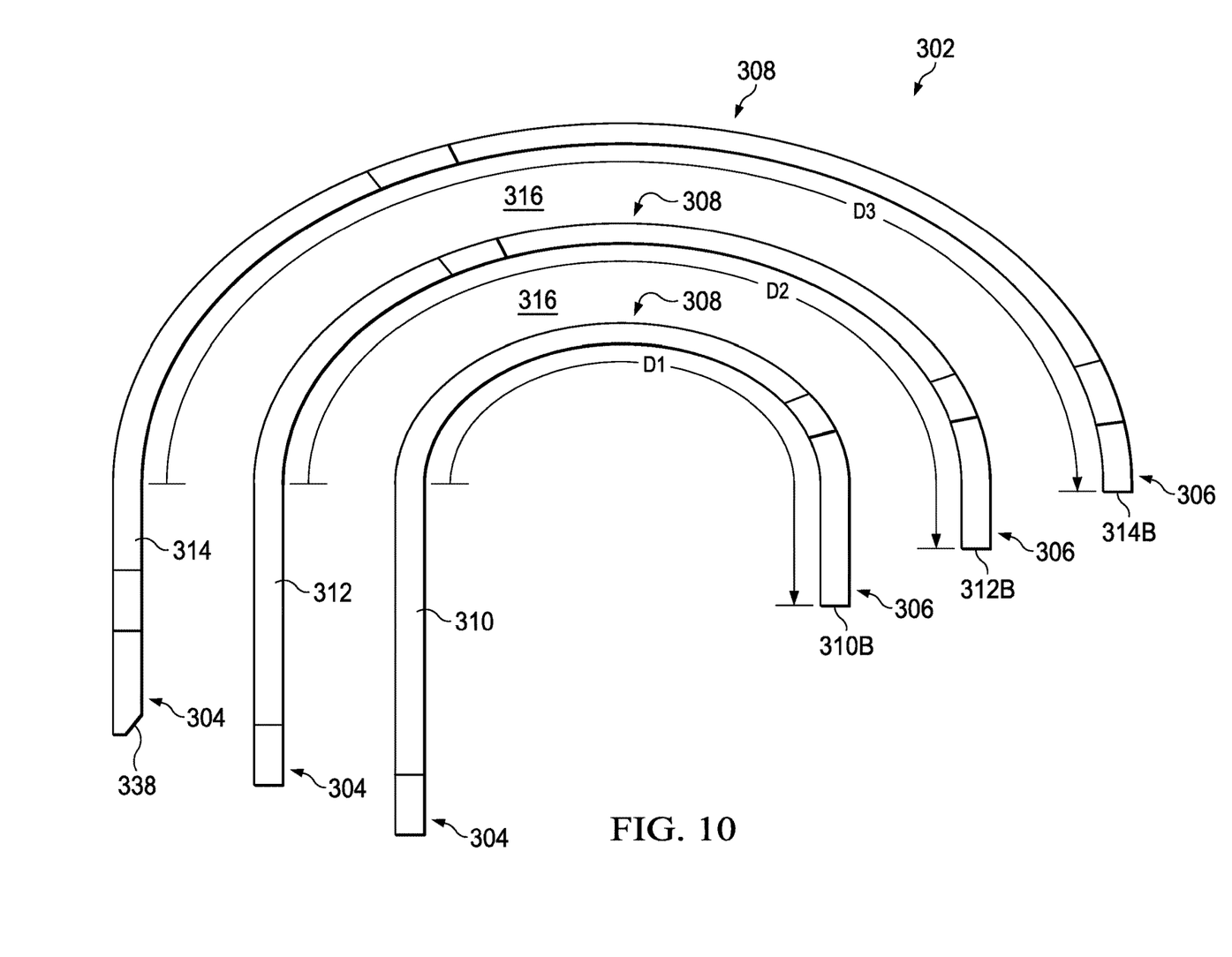
FIG. 10 depicts another example vane grouping in accordance with another non-limiting embodiment.

FIGS. 8-10 depict example vane configurations in accordance with various non-limiting embodiments. FIG. 8 depicts the inner vane 112 of the inlet diverter 100 described above and shown in FIG. 1-7. As provided above, the inner vane 112 has a leading portion 104 and a trailing portion 106. In the illustrated embodiment, the leading portion 104 is linear and the trailing portion 106 is curved. The inner vane 112 also has an outer surface 128 and an inner surface 126, each of which serves to define flow passages on either side of the vane. The curved portion 108 has a radius of curvature, which is shown as radius of curvature R, and a degree of curvature, which is shown as degree of curvature D. For vanes having a semi-circular curvature, as shown in FIG. 8, the radius of curvature can be constant throughout the entire degree of curvature. For vanes having an elliptical curvature, as shown in FIG. 10, below, or other type of curvature, the radius of curvature can vary throughout the degree of curvature. In some embodiments, the radius of curvature of the innermost vane 110 and the innermost vane 140 (i.e., R1) is between about 1.5 inches and about 4.5 inches, the radius of curvature of the inner vane 112 and the inner vane 142 (i.e., R2) is between about 2.0 inches and about 5.5 inches, and the radius of curvature of the outermost vane 114 and the outermost vane 144 (i.e., R3) is between about 3.0 inches and about 6.5 inches. In order to provide a nested arrangement of vanes, the following relationship between R1, R2, and R3 can be used: R1<R2<R3. Further, in some embodiments, the radius of curvature of the outermost vane (i.e., R3) is approximately 1.2 to 3 times greater than the radius of curvature of the innermost vane (i.e., R1).

With regard to the degree of curvature D, the inner vane 112 depicted in FIG. 8 has a degree of curvature D that is about 180 degrees. In other embodiments, however, the degree of curvature D can be less than or more than about 180. In some embodiments, the degree of curvature can be more than about 135 degrees and less than about 225 degrees. Furthermore, each vane in the vane grouping can have the same degree of curvature (as shown in FIG. 4), or the degree of curvature of a vane within the grouping can differ from the degree of curvature of another vane within the grouping.

While FIGS. 1-8 depict an example vane configuration, this disclosure is not so limited. FIG. 9 depicts a vane grouping 202 in accordance with another non-limiting embodiment. The vane grouping 202 can be similar to, or the same as in many respects as, either of the vane groupings 102 and 122 illustrated in FIGS. 1-4. For example, the vane grouping 202 has a plurality of vanes each having a leading portion 204, a curved portion 208, and a trailing portion 206. The curved portions 208 each define a respective radius of curvature, shown as R1, R2, and R3, as measured from an origin point, shown as O1, O2, O3. The vane grouping 202 defines a plurality of passages 216 between adjacent vanes. However, in this embodiment, the width of the passages 216 increases from the leading portion 204 towards the trailing portion 206. Accordingly, the offset distance D1 near the leading portions 204 of the vanes is less than the offset distance D2 near the trailing portions 206 of the vanes. One technique for providing passages that expand in width is to laterally offset the origin points of the curved portions 208 of the vanes. By way of example, the origin points O1, O2, and O3 are laterally offset which results in the passages 216 expanding in width as they travel through the vane grouping 202.

FIG. 10 depicts a vane grouping 302 in accordance with another non-limiting embodiment. The vane grouping 302 can be similar to, or the same as in many respects as, the vane grouping 202 illustrated in FIG. 9. For example, the vane grouping 302 has a plurality of vanes each having a leading portion 304, a curved portion 308, and a trailing portion 306. The vane grouping 302 defines a plurality of passages 316 between adjacent vanes. However, in this embodiment, the degree of curvature of the vanes differs such that the curvature itself is elliptical. As illustrated, the degree of curvature of the innermost vane 310 is shown as D1, the degree of curvature of the inner vane 312 is shown as D2, and the degree of curvature of the outermost vane 314 is shown as D3. As is depicted, D1 is greater than D2, which is greater than D3. By changing the degree of curvature between the vanes 310, 312, 314, their respective trailing edges 310B, 312B, 314B are obliquely aligned with one another. As is to be appreciated, other vane grouping formations may be used without departing from the scope of the present disclosure.

The dimensions and/or values disclosed herein are not to be understood as being strictly limited to the exact numerical dimensions and/or values recited. Instead, unless otherwise specified, each such dimension and/or value is intended to mean both the recited dimension and/or value and a functionally equivalent range surrounding that dimension and/or value. For example, a dimension disclosed as "40 mm" is intended to mean "about 40 mm".

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

These and other embodiments of the systems, apparatuses, devices, and methods can be used as would be recognized by those skilled in the art. The above descriptions of various systems, apparatuses, devices, and methods are intended to illustrate specific examples and describe certain ways of making and using the systems, apparatuses, devices, and methods disclosed and described here. These descriptions are neither intended to be nor should be taken as an exhaustive list of the possible ways in which these systems, apparatuses, devices, and methods can be made and used. A number of modifications, including substitutions between or among examples and variations among combinations can be made. Those modifications and variations should be apparent to those of ordinary skill in this area after having read this disclosure.

What is claimed is:

1. A method of separating a hydrocarbon well stream, comprising:

flowing a hydrocarbon well stream into an inlet of a separation vessel, wherein the hydrocarbon well stream comprises a gaseous component and a liquid component, wherein an inlet diverter is positioned inside the separation vessel at the inlet and comprises a vane assembly, wherein the vane assembly comprises a plurality of substantially parallel vanes, wherein:

each of the plurality of substantially parallel vanes has a leading portion, a trailing portion, and a curved vane portion extending between each leading portion and each trailing portion, wherein each of the leading portions extend outwardly in a first direction at a leading edge generally towards the inlet and each of the trailing portions extend outwardly in a second direction at a trailing edge generally towards the inlet, wherein the first direction is substantially parallel to the second direction, wherein each vane also comprises an inner vane surface and an outer vane surface, wherein at least a portion of the inner vane surface and the outer vane surface are curved, wherein a plurality of passages are defined between the inner and outer vane surfaces of adjacent vanes, and wherein the trailing edges of each of the trailing portions of each of the plurality of substantially parallel vanes are laterally aligned and parallel with respect to each other;

contacting the leading portions of each of the plurality of substantially parallel vanes with the hydrocarbon well stream to separate the hydrocarbon well stream into a plurality of sub-streams, wherein each sub-stream is directed into one of the plurality of passages of the inlet diverter;
decelerating the hydrocarbon well stream by flowing each of the sub-streams through the curved portions of the plurality of passages;
separating at least some of the gaseous components from the liquid components of the hydrocarbon well stream; and
discharging each of the sub-streams from the inlet diverter towards a wall of the vessel.

2. The method of claim 1, further comprising:
coalescing liquid components of the hydrocarbon well stream on walls of the plurality of substantially parallel vanes; and
dropping the liquid components of the hydrocarbon well stream into a liquid pool of the separation tank.

3. The method of claim 1, wherein a flowrate of the hydrocarbon well stream is between 0.5 million standard cubic feet per day (MMCFD) gas and 22 million MMCFD gas.

4. The method of claim 1, wherein a flowrate of the hydrocarbon well stream is between 1 blue barrels per day (bbl/day) oil and 600 bbl/day oil.

5. The method of claim 1, wherein a flowrate of the hydrocarbon well stream is between 5 blue barrels per day (bbl/day) oil and 600 bbl/day water.

6. A method of separating a multiphase mixture, comprising:
receiving a multiphase flow through an inlet;
contacting the multiphase flow flowing in a first direction with a leading portion of each of a plurality of vanes of a vane assembly, each leading portion extending outwardly in a second direction opposite the first direction, wherein the plurality of vanes are laterally spaced apart to such that inner and outer vane surfaces of adjacent vanes define a plurality of passages that each comprise a curved portion;
routing the multiphase flow through the curved portions of the plurality of passages towards trailing portions of each of the plurality of vanes to decelerate the multiphase flow, each of the trailing portions extending outwardly in the second direction at a trailing edge; and
discharging at least a portion of the decelerated multiphase flow in the second direction from the passages of the vane assembly towards the inlet.

7. The method of claim 6, wherein at least one of the plurality of passages expands in width along the passage.

8. The method of claim 6, wherein each of the plurality of passages is at least partially defined by adjacent vanes having curved portions.

9. The method of claim 8, wherein each of the plurality of passages is at least partially defined by a top plate and a bottom plate.

10. The method of claim 8, wherein the curved portions are in a nested configuration.

11. The method of claim 6, wherein discharging at least a portion of the decelerated multiphase flow from the passages of the vane assembly towards the inlet comprises discharging at least a portion of the decelerated multiphase flow from the passages of the vane assembly in a direction of flow substantially opposite to a direction of flow of the multiphase flow received through the inlet.

12. The method of claim 11, wherein discharging at least a portion of the decelerated multiphase flow from the passages of the vane assembly towards the inlet comprises discharging at least a portion of the decelerated multiphase flow from the vane assembly towards an interior wall of a vessel.

13. The method of claim 6, wherein the multiphase flow comprises petrochemicals.

14. A method of separating a multiphase mixture, comprising:
receiving a multiphase flow comprising petrochemicals through an inlet of a vessel;
flowing the multiphase flow into a vane assembly in a first direction of flow, wherein the vane assembly comprises a plurality of vanes, wherein each of the plurality of vanes has a leading portion and a trailing portion, wherein each of the leading portions extend outwardly towards the inlet at a leading edge and each of the trailing portions extend outwardly towards the inlet at a trailing edge, wherein the plurality of vanes are laterally spaced apart to define passage between adjacent vanes, wherein each of the passages between adjacent vanes comprises a curved portion, and wherein the trailing edges of each of the trailing portions of each of the plurality of substantially parallel vanes are laterally aligned and parallel with respect to each other;
routing the multiphase flow through the curved portions of the passages between adjacent vanes;
changing the direction of flow of the multiphase flow; and
discharging at least a portion of the multiphase flow from the passages between adjacent vanes, wherein the at least a portion of the multiphase flow is discharged in a second direction of flow, and wherein the second direction of flow is substantially opposite to the first direction of flow.

15. The method of claim 14, wherein at least one of the passages between adjacent vanes expands in width along the passage.

16. The method of claim 14, wherein each of the passages between adjacent vanes is at least partially defined by adjacent vanes having curved portions.

17. The method of claim 16, wherein each of the passages between adjacent vanes is at least partially defined by a top plate and a bottom plate.

18. The method of claim 16, wherein the curved portions of each of the passages between adjacent vanes are in a nested configuration.

19. The method of claim 14, wherein discharging at least a portion of the multiphase flow from the passages between adjacent vanes comprises discharging at least a portion of the multiphase flow the passages between adjacent vanes towards a wall of a vessel.

20. The method of claim 14, further comprising:
coalescing liquid components of the multiphase flow on walls of the plurality of substantially parallel vanes; and
dropping the liquid components of the multiphase flow into a liquid pool of the vessel.

* * * * *